United States Patent

[11] 3,569,675

[72] Inventor Bernardus Stegeman
Amsterdam, Netherlands
[21] Appl. No. 826,871
[22] Filed May 22, 1969
[45] Patented Mar. 9, 1971
[73] Assignee Bull General Electric (Nederland) N.V.
Amsterdam, Netherlands
[32] Priority June 13, 1968
[33] Netherlands
[31] 6808283

[54] APPARATUS FOR READING MARKS ON OR PERFORATIONS IN RECORD CARDS
5 Claims, 6 Drawing Figs.

[52] U.S. Cl. .......... 235/61.11, 250/219
[51] Int. Cl. .......... G06k 7/14, G01n 21/30
[50] Field of Search .......... 235/61.115, 61.6 (Cursory), 61.9 (Cursory); 250/219; 340/146.3 (Inquired)

[56] References Cited

UNITED STATES PATENTS

| | | | |
|---|---|---|---|
| 3,437,793 | 4/1969 | Van Berkel | 235/61.7 |
| 3,463,930 | 8/1969 | West | 250/219 |
| 3,467,820 | 9/1969 | Droege | 235/61.11 |
| 3,476,918 | 11/1969 | Howell | 235/61.11 |
| 3,480,762 | 11/1969 | del Vecchio | 235/61.11 |
| 3,517,386 | 6/1970 | Jones | 340/146.3 |
| 3,518,440 | 6/1970 | Hanson | 250/219 |

*Primary Examiner*—Maynard R. Wilbur
*Assistant Examiner*—Robert M. Kilgore
*Attorney*—Baldwin, Wight, & Brown

ABSTRACT: In a record card sorting machine the cards comprise a plurality of columns for recording data by means of performations and/or marks of dark colour and a card is fed through a card passage in a direction parallel to the columns. A reading apparatus comprises a support for fixing a certain number of elongate cylindrical lenses in such manner that each lens is aligned and parallel with a location for reading a corresponding column. Below the support, a movable carriage supports a scanning device with a light source and a photoelectric cell, and may be successively brought into a number of stop positions by a driving mechanism, whereby the scanning device may be aligned with each of the cylindrical lenses.

Inventor:
Bernardus Stegeman
BY Baldwin Wight Diller & Brown
Attorneys

APPARATUS FOR READING MARKS ON OR PERFORATIONS IN RECORD CARDS

This invention relates to improvements in photoelectric apparatus for reading marks or perforations situated on or in recording media such as cards, tapes, etc.

Some known reading apparatus are adapted only to read dark marks, and others are adapted to read only perforations. Although there exist reading apparatus which are capable of reading perforations in or marks on moving record cards, these do not have all the desirable efficacy, and their construction and use suffer from a certain complexity, so that they are not very economical.

In a related field of application, an analyzing apparatus for analyzing a moving diapositive is known, which comprises, on one side of the diapositive, a lamp and an elongate cylindrical lens which are disposed parallel to the diapositive and perpendicularly to the direction of its movement, and on the other side a series of photoelectric cells arranged to receive the light which has passed through the diapositive.

On the other hand, there is known an apparatus for reading dark marks on moving record cards, which comprises, on the same side of the card, two light sources, two semicylindrical lenses for concentrating the light on a reading location, and a photoelectric converter arranged to receive the light reflected perpendicularly by the reading location in the absence of a mark. This apparatus has been described in U.S. Pat. application No. 737,616 filed Jun. 17, 1968.

Such an apparatus is not very effective, is of relative complex construction and requires switching circuits for changing from mark reading to perforation reading and vice versa.

The present invention has for its object to provide a photoelectric reading apparatus which is capable of reading perforations in or marks on record cards without requiring any switching, and which is not attended by the aforesaid disadvantages.

In accordance with the invention, there is provided an apparatus for reading in at least one record column perforations and/or dark marks in or on a record card which is moved through a card guide passage in the direction of the columns, which apparatus comprises on the same side of the card passage a light source, a cylindrical lens positioned for concentrating the light on a reading location and a photoelectric converter arranged to receive the light reflected perpendicularly by the reading location in the absence of perforations or marks, the said apparatus being characterized in that it is provided with support means for securing in proximity to the reading location at least one cylindrical lens whose axis is parallel both to one face of the card and to the axis of a card column, in order to position a photoelectric cell on the other side of the lens and, as known, on an axis substantially perpendicular to the reading location, and in order to position a light source adapted to direct a light beam obliquely in relation to the said axis, so that the said beam passes obliquely through the cylindrical lens, the arrangement being such that the sensitive part of the cell receives through the lens the reflected light diffused by the card column, as long as the latter does not comprise any mark or perforation, and that the cell receives substantially no light when a mark or perforation is situated in the reading location.

The invention lends itself particularly well to application in a record card sorting machine in which the reading device must be capable of reading one after the other a number N of columns of marks or perforations. In this case, there is provided a number N of cylindrical lenses which are fixed in a crosspiece of the card passage, each lens being positioned as indicated in the foregoing and opposite a corresponding column of the card, a displaceable carriage which is adapted to support the photoelectric cell and the incandescent lamp employed as light source, and driving means adapted to position the carriage at each actuation in such manner that the photoelectric cell is opposite the lens corresponding to the column to be read, the crosspiece comprising an arm formed with a slot along the axis of each lens, so that the said slot bounds a light beam which is distinctly narrower than one perforation between the lamp and the said cylindrical lens.

Further features of the invention and the manner in which it is put into practice will be more clearly apparent from the detailed description given by way of example with reference to the accompanying drawings, in which.

Figures 1, 6:
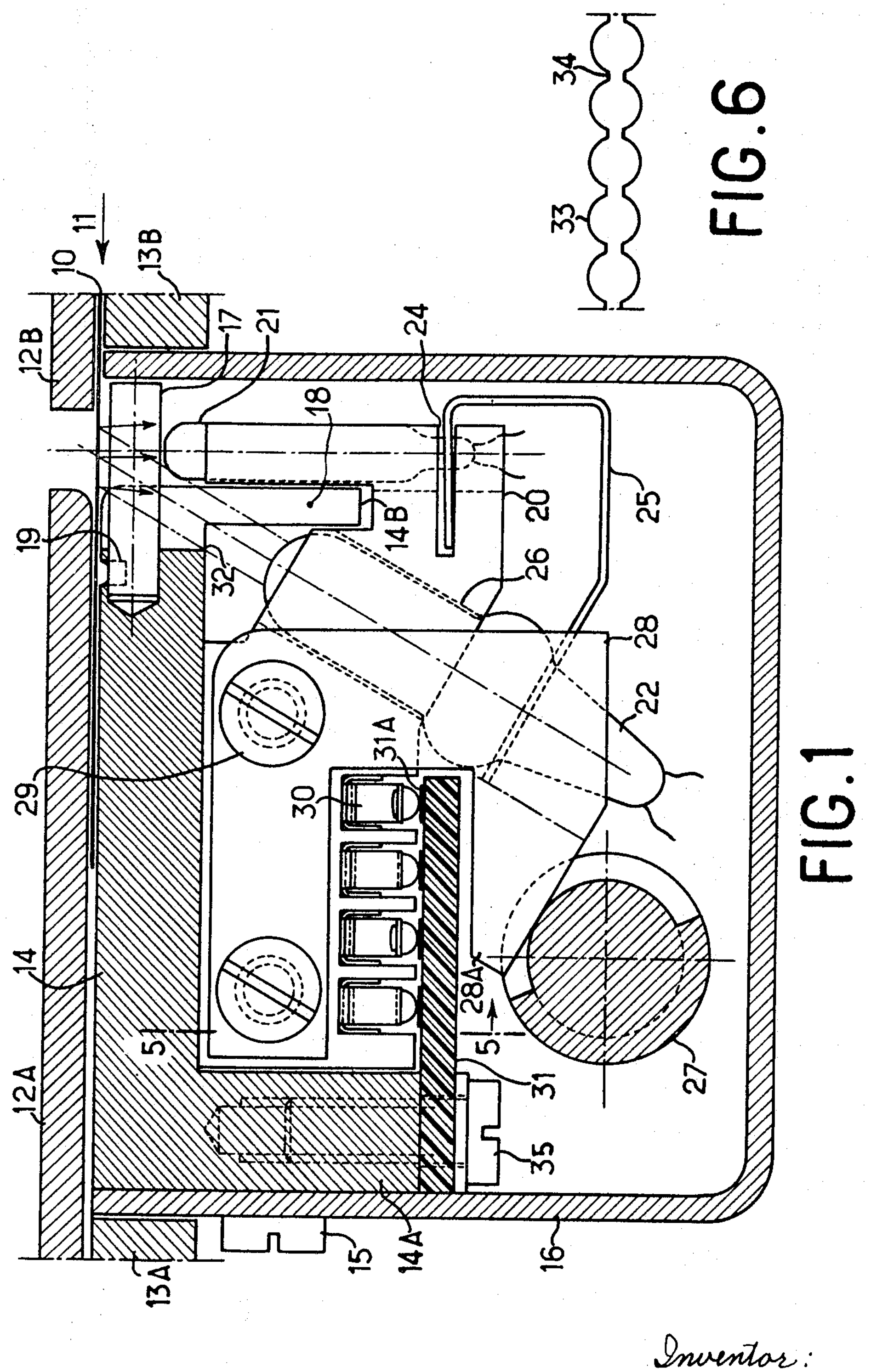
FIG. 1 is a view in transverse section of the reading apparatus.
FIG. 6 is a view of a number of cylindrical lenses assembled to form a single piece.

By way of example, the card reading apparatus is incorporated in a card sorting machine in which the 80 record columns of a punched card of known type are to be successively read. It will be assumed that this machine is provided with card-advancing means (not shown), which are capable of moving a card 10 (FIG. 1) through a card passage, in the direction indicated by the arrow 11, i.e. in a direction parallel to the columns of perforations in the card.

The card passage may comprise an upper plate composed of two parts 12A, 12B and a lower plate consisting of a number of elements. These elements comprise the plates 13A, 13B and the crosspiece 14. It will be understood that the crosspiece extends over a length at least equal to the length of a card in order to be fixed at its ends to the frame of the machine by any appropriate means.

The transverse section of the crosspiece 14 substantially resembles an inverted U. Secured by screws 15 to the left-hand arm 14A (in FIG. 1) of the crosspiece is a protective casing 16 consisting of a metal sheet bent into the form of a U. Formed above the other arm 14B of the cross piece are 80 holes serving to receive 80 cylindrical lenses 17, the axes of which are horizontal. The holes are so situated that each lens is exactly in proximity to and below a column of perforations in the card. Since the spacing of these columns is 2.21 mm., the cylindrical lenses are obviously spaced at the same distance apart. This lens which consists of glass or of another transparent body such as "Plexiglas" (Registered Trade Mark), has a diameter of 2 mm. A slot 18 FIGS. 1, 2 and 3) is machined in the arm 14B, forming a diaphragm, of the crosspiece, along the axis of each of the holes receiving the lenses 17. The width of these slots may be 0.6 mm. A groove 19 extending along the length of the upper face of the crosspiece is provided to enable the ends of the lenses to be adhesively secured.

Figure 3:
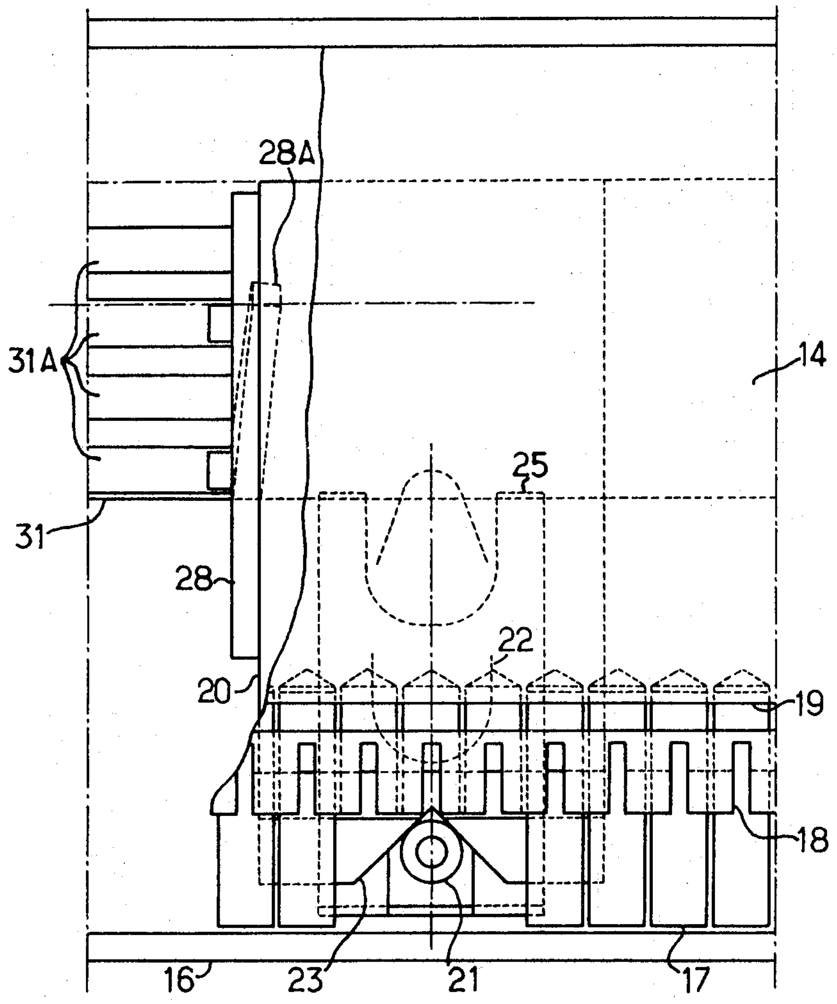
FIG. 3 is a view of the apparatus from above.

A displaceable carriage 20 is provided to support a photoelectric cell 21 and a small incandescent lamp 22. The cell 21 may be a phototransistor and may have a generally cylindrical form, with a diameter of the order of 2 mm. Some types comprise an external screening 21A of small thickness which may be adapted to define a window at the end of the cell, as may be seen in FIG. 4. This window may correspond to the cone of maximum sensitivity of the cell and has an aperture angle of 30°. As may be seen from FIG. 3, one end of the carriage 20 is formed with a V-shaped recess 23 in which the cell 21 may be simply adhesively secured or fixed by any other appropriate means. It is to be noted that FIG. 3, is drawn as if three of the lenses 17 have been removed and as if a part of the crosspiece 14 has been broken away to show a part of the members situated below it. The vertical axis of the cell (FIG. 1) is opposite a reading location, above which is situated the slot defined by the spacing of the plates 12A and 12B.

A horizontal slot 24 in the carriage 20 permits the positioning of one end of the spring 25, which serves to maintain the lamp 22 in the hole 26. The other slotted end of the spring 25 may be seen in FIG. 3.

A driving screw 27 having a rectangular thread is disposed horizontally below the crosspiece 14 and below the carriage 20. A cheek 28 is secured by two screws 29 on one side of the carriage. The cheek 28 comprises a bent over lug 28A, of which one edge rests on the core of the screw 27, and which performs the function of a nut thread. The bending angle of the lug corresponds to the angle of inclination of the thread turns of the screw in relation to the axis of the latter. In the present case, the pitch of the thread of the screw 27 is also 2.21 mm. Any known means may be provided to impart rotational movements to the screw, i.e. a rotation of one revolution to advance the carriage by one step, and means for the initial adjustment of the angular position of the screw, so that in the reading of any column of perforations the vertical plane including the lamp 22 and the cell 21 is situated in alignment with the axis of a cylindrical lens and therefore with the axis of a column of perforations.

Figure 5:
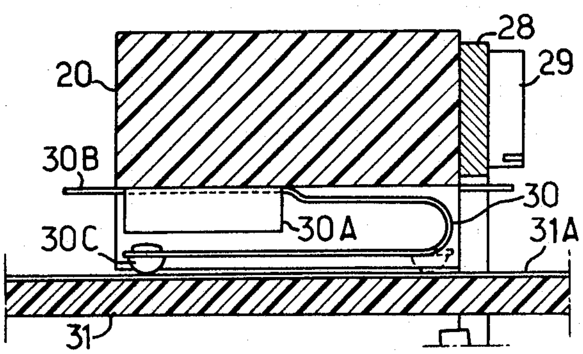
FIG. 5 is a sectional view of the carriage, taken along the line 5–5 of FIG. 1.

One lower face of the carriage 20 is formed with four grooves (FIG. 1) serving to receive four spring contact blades 30, which will be more clearly seen in the section of FIG. 5. Each contact blade is maintained in its recess owing to the pressure of the two arms 30A of a U-shaped member. Two contact blades are so oriented that their soldering lug 30B and their contact stud 30C are disposed on the side of the left-hand face of the carriage, while the other two are oriented inversely in relation thereto. Conductors (not shown) serve to connect two output wires of the photoelectric cell 21 to the soldering lugs of two contact blades 30, while the soldering lugs of the other two contact blades are connected respectively to two wires of the lamp 22.

A strip 31 of insulating material is secured by screws 35 below the arm 14A of the cross member 14. This strip carries four bus bars 31A obtained by any method of depositing printed circuits. The contact studs 30C bear against the conductors 31A, of which two serve to supply the feed current to the lamp 22 and of which the other two serve to collect the reading signal emanating from the cell 21.

Since the grooves in the carriage serve to receive the contact blades 30, it is necessary for the carriage to consist entirely of an insulating material. In order that this material may be resistant to the heating produced by the incandescent lamp 22, it may be "Celoron" (Registered Trade Mark) or a similar material.

Figure 2:
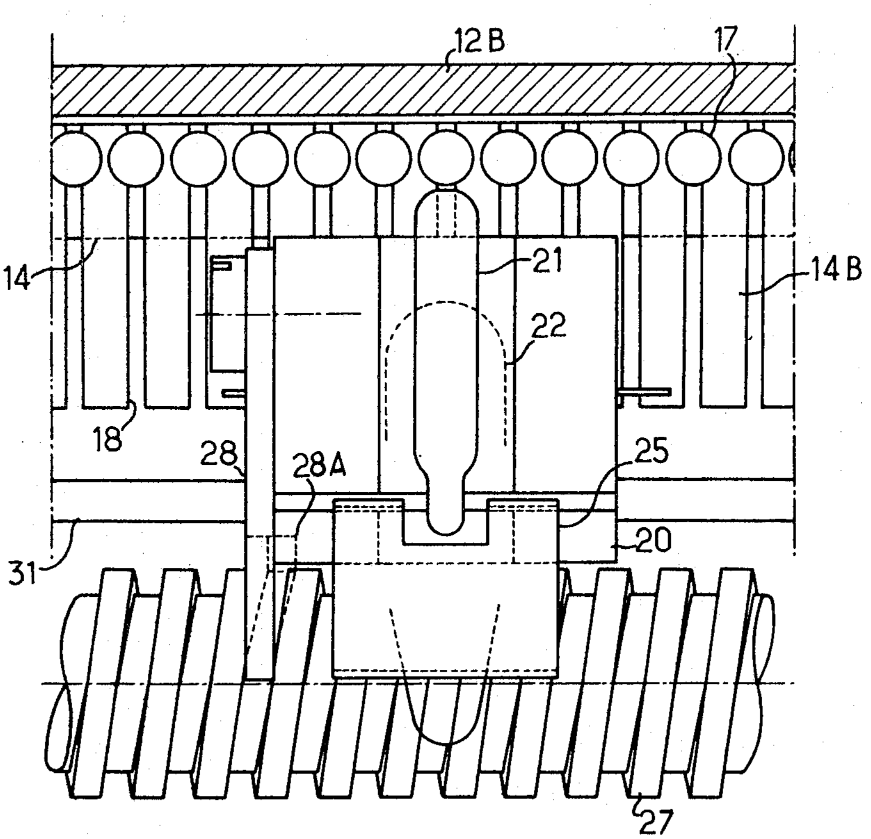
FIG. 2 is a front view of the apparatus.

It will be seen from FIG. 1 that the contact blades 30 tend to apply the upper face of the carriage 20 against the lower face of the crosspiece 14. It will also be seen that the axis of the lamp 22 is inclined at about 30° in relation to the axis of the cell 21, so that a light beam is directed towards the reading location. The horizontal depth of each slot 18 in the crosspiece 14 is such that the edge 32 formed bounds the luminous beam on one side, the said beam being bounded on the other side by the cell 21 itself.

This light beam, the thickness of which is on the other hand limited by the width of the slot 18, passes obliquely through the cylindrical lens 17, and on leaving the latter impinges on the lower face of a card assuming that one is present at this instant in the reading station. In addition, if there is no perforation above the reading location, the reflected light diffused by the clear surface of the card passes through the cylindrical lens in the opposite direction and leaves it again so as to reach the end of the photoelectric cell. Therefore, during the passage of the imperforate portion of the card, the cell is illuminated and the signal level may be negligible or even zero.

In passing through a perforation in the card in front of the reading location, the light which has passed through the lens 17 is not reflected and the cell is not illuminated. Its ohmic resistance then becomes very high. This resistance change may be utilized in known manner to generate a voltage pulse, which is thereafter applied to the input of a transistorized amplifier in the usual way if necessary.

If, in the construction of the card passage, the plates 12A, 12B are replaced by a thicker plate, the latter may be formed with a groove, for example of rectangular cross section, but it is then desirable to blacken the three faces of the groove in order prevent any reflection of light.

It is to be noted that in the case of a card bearing printed marks, any mark of sufficiently dark color behaves exactly in the same way as a perforation in regard to the nonreflection of the light.

One of the essential advantages of the reading apparatus according to the invention is that it permits relatively large dimensional tolerances without the operating reliability thereby being reduced. This advantage results mainly from the favorable orientation of each of the cylindrical lenses 17, i.e. in parallel relationship to the length of the perforations. Indeed, it may be arranged that the image of the light source projected onto the card has only a width of 0.5 mm., while its length may be of the same order as the length of a perforation. Since the width of a perforation is usually 1.5 mm., it is permissible for a card to be laterally offset; i.e. for the axes of the columns of perforations to be out of alignment by substantially 0.5 mm. in relation to the axes of the slots 18, before the light is unduly reflected in its passage through a perforation at the reading station. In addition, since this image is relatively large, a single light source is sufficient.

Figure 4:
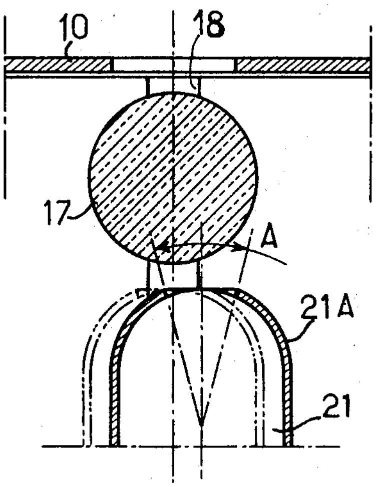
FIG. 4 is a sectional view of a cylindrical lens and of the end of the photoelectric cell.

On the other hand, as may be seen from FIG. 4, the axis of the photoelectric cell may also be offset, at the time of the reading, in relation to the axis of a slot 18. In FIG. 4, the dash-dotted lines represent the position of the cell 21 when it is exactly centered in coincidence with the axis of a slot, and of the corresponding lens. The solid line represents maximum axial offset of the cell 21. If the aperture angle A which defines the solid light-receiving angle, is 30°, for example, this offset may reach 0.5 mm., on one side or the other without preventing the cell from receiving a sufficient reflected luminous flux for its resistance to be low, in the absence of a perforation at the reading location. Consequently, mechanical parts which assist in positioning the photoelectric cell do not require machining and assembly of very high precision. The cost of the reading apparatus may accordingly be reduced.

FIG. 6 illustrates a modified construction of the cylindrical lenses. The assembly 33, of which only a small portion has been shown, is distinguished from the construction previously described in that the lenses are connected together by junctions 34. These junctions have a thickness such that they do not modify the travel of the direct or reflected light rays within each lens. The molded assembly, consisting of glass or "Plexiglas," may be made in the form of a single element comprising 80lenses, or in the form of a number of elements, for example eight elements each comprising 10 lenses. It is obvious that in this case a horizontal slot is required in the cross piece 14 for the passage of the junctions. The advantage of this solution is that it is no longer necessary for the 80 lenses to be individually adhesively secured. In addition, the groove 19 is no longer necessary.

A modified construction for the application of the invention to a card sorting machine may be envisaged, in which it would be necessary to read simultaneously two columns of perforations, although each elemental displacement of the movable portion of the reader takes place through one column pitch. In this case, the carriage 20 may be formed with two V-shaped slots to maintain two cells 21 with a spacing of 2.21 mm. A single lamp 22 could be used provided that the plane containing its axis is situated exactly between the axes of the two cells. It will be appreciated that if the lamp is sufficiently large for its light beam to cover two neighboring slots 18, two adjacent columns of perforations may be read at a time.

On the other hand, if means are provided for electrically insulating the contact blades 30 from the body of the carriage 20, the latter may be a metal member, for example a member consisting of a light metal alloy.

While the reading apparatus has been described in the foregoing, in accordance with the drawings, as being situated below the card passage, there would be no major obstacle to adapting this apparatus to be located above the card passage.

Although the essential features of the invention have been described in the foregoing and illustrated in the drawings, it is obvious that the person skilled in the art may make therein any modifications of form and detail which are considered desirable without departing from the scope of the invention.

I claim:

1. In an apparatus for reading perforations and/or dark marks in a plurality of record columns in/on a record card which is moved through a card passage parallel to said columns, said apparatus comprising a support adapted to maintain on the same side of the path of the card a light source for directing a light beam obliquely to a reading location, and a photoelectric reading member capable of receiving the diffuse light reflected perpendicularly by said reading location, the combination comprising:

a fixed crosspiece adapted to support an equal plurality of elongate cylindrical lenses, in such manner that these lenses, which are spaced apart in the same way as said card columns, are positioned in proximity to said reading locations on the same side of the card path and have their axes parallel to said columns;

a support carriage adapted to maintain in position said light source and said photoelectric reading member; and a driving mechanism adapted and arranged to cooperate with said carriage in such manner as to bring the latter successively into a number of stop positions, such that in each stop position said light source and said photoelectric member are in the same plane as one of said cylindrical lenses.

2. The combination according to claim 1, wherein said driving mechanism comprises a screw situated on the other side of said carriage, with its axis of rotation perpendicular to the direction of the card columns, and the thread pitch of which is equal to the spacing of said columns, and wherein said carriage comprises a cheek-shaped in the form of a portion of a nut thread, which is engaged between two thread turns of said screw.

3. The combination according to claim 1, wherein said crosspiece is provided with an arm situated between said lenses and said light source and comprises a plurality of slots which are aligned with said cylindrical lenses, the width of each of these slots being substantially one-third of the width of a card perforation.

4. In an apparatus for reading perforations and/or dark marks in a plurality of record columns in/on a record card which is moved through a card passage in a direction parallel to said columns, said apparatus comprising a support adapted to maintain on the same side of the card passage a light source for directing a light beam obliquely to a reading location and a photoelectric reading member capable of receiving the diffuse light reflected perpendicularly by said reading location, the combination comprising:

a fixed crosspiece adapted to support a common plurality of elongate cylindrical lenses, in such manner that these lenses, which are spaced apart to the same extent as said card columns, are disposed in proximity to said reading locations on the same side of the card path and have their axes parallel to said columns;

a support carriage adapted to maintain in position said light source and said photoelectric reading member, the carriage being provided with a thin member shaped in the form of a portion of a nut thread; and a driving mechanism including a screw whose thread pitch is equal to the spacing of the card columns, and which is disposed parallel to said card path and perpendicularly to the direction of the card columns, in order that said thin member of the carriage may be engaged between two thread turns of said screw, the latter being actuated to take up successively a plurality of stop positions such that, in each of them, said light source and said photoelectric member are aligned with a different one of said cylindrical lenses.

5. The combination according to claim 4, wherein said crosspiece is provided with an arm situated between said lenses and said light sources, and comprises a plurality of slots which are aligned with said cylindrical lenses, the width of each of these slots being substantially one-third of the width of a card perforation.